United States Patent [19]

Furumoto

[11] Patent Number: 4,554,410
[45] Date of Patent: Nov. 19, 1985

[54] SYSTEM FOR MAINTENANCE AND DIAGNOSIS OF MOBILE TELEPHONE EQUIPMENT

[75] Inventor: Takayuki Furumoto, Yokohama, Japan

[73] Assignee: Hitachi, Ltd., Tokyo, Japan

[21] Appl. No.: 550,588

[22] Filed: Nov. 10, 1983

[30] Foreign Application Priority Data

Nov. 12, 1982 [JP] Japan ................... 57-197733

[51] Int. Cl.[4] .............................. H04Q 7/04
[52] U.S. Cl. .................... 179/2 E; 179/2 EB
[58] Field of Search ............. 179/2 E-2 EC; 455/67, 115, 226, 33

[56] References Cited

U.S. PATENT DOCUMENTS 4,415,770 11/1983 Kai et al. ............... 455/67 X
4,443,661 4/1984 Kubo ..................... 179/2 EB Primary Examiner—Gene Z. Rubinson
Assistant Examiner—W. J. Brady
Attorney, Agent, or Firm—Antonelli, Terry & Wands

[57] ABSTRACT

For maintenance and diagnosis of mobile telephone equipment carried on a vehicle such as a car, ship or airplane, an input/output port of a control unit for effecting desired controlling and processing for individual parts of the mobile telephone equipment on the basis of stored program control is inputted with test mode information in the form of a logic signal supplied manually or a specified dial number signal supplied by dialing a telephone unit so as to switch the mobile telephone equipment to a test mode. Thereafter, a predetermined test instruction and a predetermined additional data are inputted to the input/output port by dialing the telephone unit. The control unit then reads the instruction and data to select and execute a desired, predetermined test program. A result of the execution is indicated on an indicator of the telephone unit for maintenance and diagnosis.

3 Claims, 5 Drawing Figures

SYSTEM FOR MAINTENANCE AND DIAGNOSIS OF MOBILE TELEPHONE EQUIPMENT

BACKGROUND OF THE INVENTION

1. Field of the Invention

The present invention relates to a system for maintenance and diagnosis of mobile telephone equipment and more particularly to a system of this type which is adapted for efficient and economic maintenance and diagnosis of mobile telephone equipment carried on a vehicle, such as a car, ship, airplane or the like.

For example, small scale car telephone services using ten channels at the most within a 150 MHz frequency band started in 1949 in St. Louis in the United States. Thereafter, with the 1971 earthquake which hit the suburbs of Los Angeles, car telephone equipment was put into practice in large scale and this was followed by enlargement of capacity and reduction of size and weight of the equipment by introducing digital technology and utilizing microcomputers and LSI technology.

2. Description of the Prior Art

Considering car telephone services as an example of the mobile telephone services, these services have already been commercialized in large cities in Japan. In the United States, too, the car telephone services are today under field tests and on the verge of commercialization in the near future. Further, in other countries, efforts have been made to research, develop and put into practice the car telephone services and, like general telephone services, they are expected to come into wide use in the future.

Mobile telephone equipment for car telephone services are carried on a car of each subscriber and they can be moved here and there to perform desired telephone communication (talking). In the event of a failure of talking, for example, the subscriber claims or declares such a failure. In response thereto, maintenance and diagnosis of the mobile telephone equipment must be performed without dismantling the equipment from the car.

According to conventional maintenance and diagnosis, a service engineer carries an instrument dedicated to maintenance with him to the car carrying the defective equipment so as to perform maintenance and diagnosis in accordance with the following procedures:

(1) Operations as claimed by the subscriber are repeated to confirm reappearance of abnormal states;

(2) When, in effect, abnormal states as claimed by the subscriber are confirmed, the instrument for maintenance is connected to the mobile telephone equipment and various commands are inputted thereto to check various response signals, thereby confirming presence or absence of faults and faulty locations;

(3) Faulty locations are adjusted or repaired and faulty parts or units are exchanged with new ones and thereafter, recovery to normal states is confirmed and the repaired equipment is handed over to the subscriber; and (4) The faulty parts or units are brought back to a maintenance center for precise diagnosis and repairs.

The above procedures tell the fact that particularity of the equipment carried on the vehicle burdens the service engineer with heavy labor and besides, a fairly sophisticated and large-sized instrument for maintenance is required. Therefore, for future development of such services, efficient and economic maintenance and diagnosis of the mobile telephone equipment are desired.

SUMMARY OF THE INVENTION

It is an object of the present invention to obviate the above prior art drawbacks and to provide a system for maintenance and diagnosis of mobile telephone equipment which is accessible to the equipment without resort to any maintenance instruments.

Specifically, according to the present invention, there is provided an efficient and economic system for maintenance and diagnosis which is adapted for mobile telephone equipment having a telephone unit with an indicator for indication of at least dial numbers in addition to ordinary functions of a telephone set, a radio transmission/reception unit and an antenna unit for transmission and reception of control signals, data signals and audio signals used for telephone communication, and a control unit for effecting controlling and processing required for the aforementioned units on the basis of stored program control. An input/output port of the control unit is inputted with test mode information in the form of a logic signal supplied manually or a specified dial number signal supplied by dialing the telephone unit so as to switch the mobile telephone equipment to a test mode. Thereafter, a predetermined test instruction and predetermined additional data are inputted to the input/output port by dialing the telephone unit. The control unit then reads the instruction and data to select and execute a desired, predetermined test program so that a result of the execution can be controlled and processed for indication on the indicator of the telephone unit.

DESCRIPTION OF THE PREFERRED EMBODIMENT

A preferred embodiment of a system for maintenance and diagnosis of mobile telephone equipment according to teachings of the present invention will now be described with reference to FIGS. 1 to 5.

Figure 1:
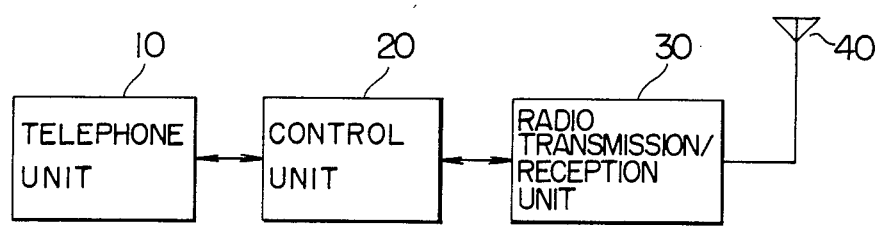
FIG. 1 is a schematic block diagram of mobile telephone equipment according to this invention.
Figure 2:
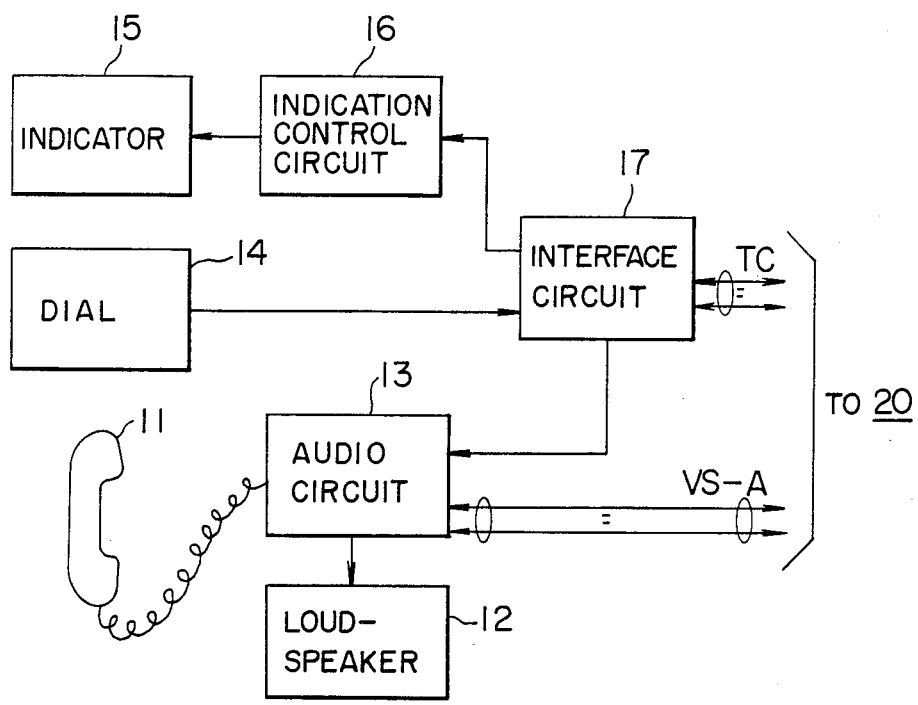
FIG. 2 is a block diagram of a telephone unit included in the equipment of FIG. 1.

As shown in FIGS. 1 and 2, a telephone unit 10, generally illustrated in block form in FIG. 1, has a transmitter/receiver 11, a loudspeaker 12, an audio circuit 13, a dial 14 (for example, a push-button dial), an indicator 15 for indication of dial numbers and the like, an indication control circuit 16, and an interface circuit 17 disposed between the aforementioned components of the telephone unit and a control unit 20 to be described below.

Figure 3:
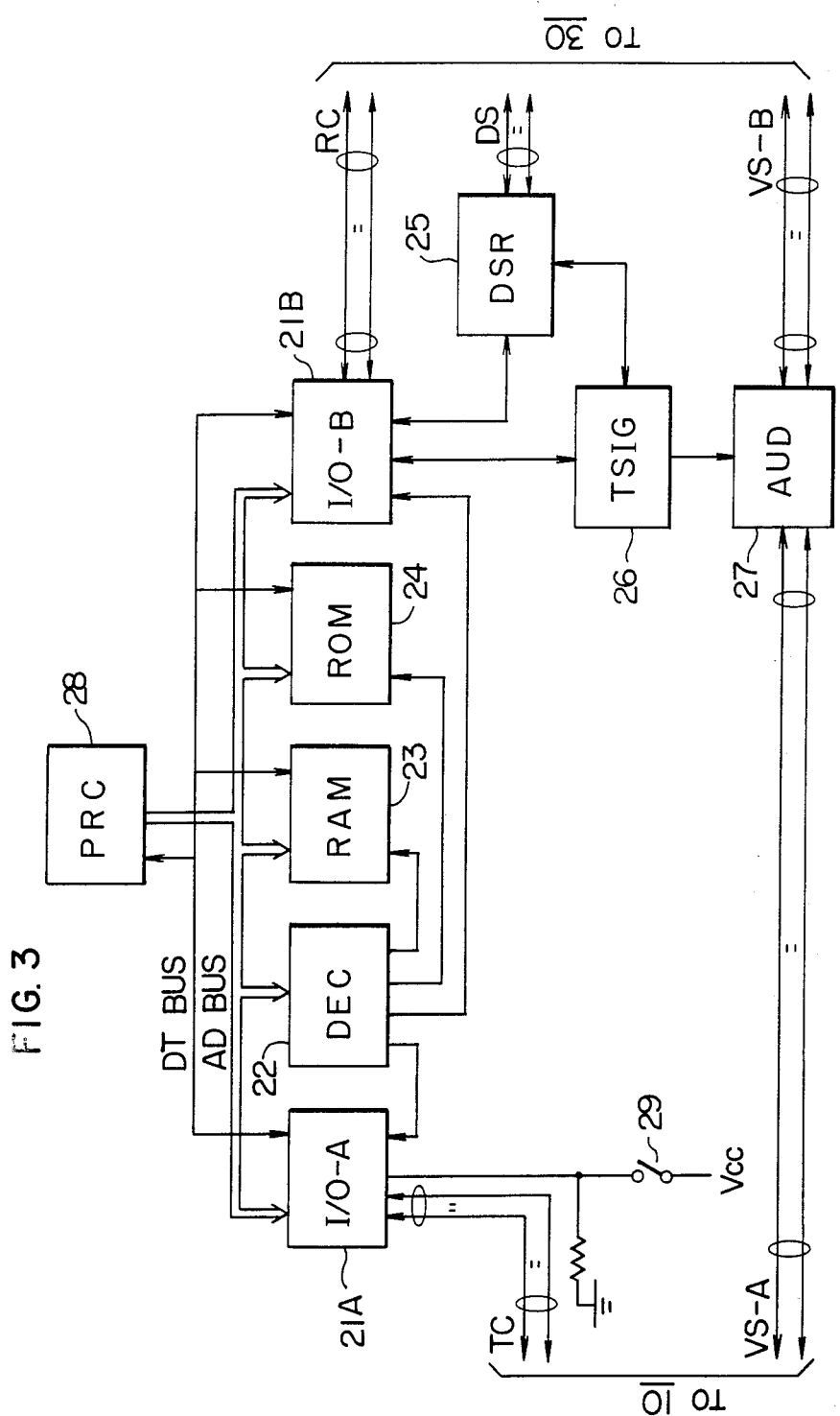
FIG. 3 is a block diagram of a control unit of the equipment of FIG. 1.
Figure 4:
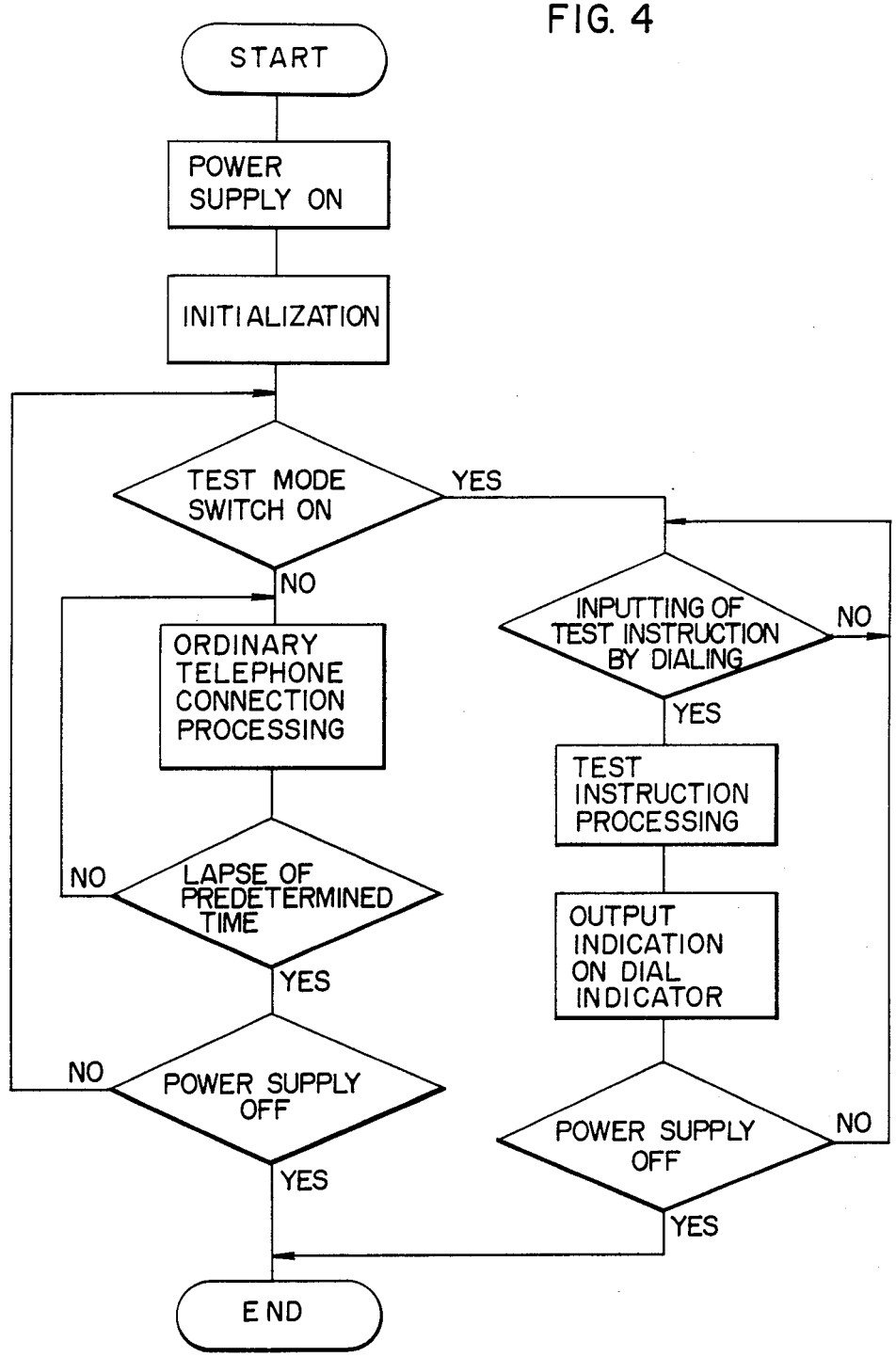
FIG. 4 is a flow chart for explaining the operation of a system for maintenance and diagnosis of mobile telephone equipment according to this invention.

As diagrammatically shown in FIG. 3, the control unit 20, operable on the basis of stored program control, comprises an input/output port 21A associated with the telephone unit 10, an input/output port 21B associated with a radio transmission/reception unit 30, a decoder (DEC) 22, a random access memory (RAM) 23, a read only memory (ROM) 24, a data sending/reception circuit (DSR) 25, a tone signal sending/reception circuit (TSIG) 26, an audio circuit 27, a processor (PRC) 28, and a switch 29 for inputting test mode information. An antenna unit 40 is coupled with the radio transmission/-reception unit 30 as shown in FIG. 1.

To perform maintenance and diagnosis with the system of the present invention, the switch 29 included in the control unit 20 is first turned on to input test mode information in the form of a logic signal to the input-/output port 21A. It is not always necessary that the input information take the form of a logic signal and be inputted by means of the switch 29. Alternatively, the information may take the form of a specified dial number which is unavailable from ordinary telephone numbers and may be generated by manipulating the dial 14 or dialing the telephone unit 10 so as to be inputted to the input/output port 21A via the interface circuit 17.

Upon reception of the test mode information, the processor 28, which reads periodically the state of the input/output port 21A, detects and checks the test mode information and thereafter switches its control-/process function to a test mode, making preparation for receiving subsequent input signals.

For example, keys of the dial 14 are operated in accordance with the following Table to input desired test instruction and additional data to the input/output port 21A via the interface circuit 17 and a control signal (TC) line:

TABLE

| Dial key | Contents of test instruction and additional data |
| --- | --- |
| 1 | Tone is rendered ON |
| 2 | Tone is rendered OFF |
| 3 | Channel is set (additional data is required) |
| 4 | Status is read |
| 5 | Received signal strength is read |
| 6 | Received data is read |
| 7 | Contents of memory in the address indicated by additional data are read |
| 8 | Preparatory |
| 9 | Preparatory |
| 0 | Preparatory |
| * | Inputting of the instruction is terminated |
| # | Inputting of the additional data is terminated |

The processor (PRC) 28 reads the test instruction by way of a data bus (DT BUS) and designates an address by way of an address bus (AD BUS) to start the ROM 24. The processor (PRC) 28 also reads a test program indicative of a predetermined procedure by way of the data bus and processes a desired test instruction in accordance with the test program to return a result, standing for a control signal (TC) for the test mode, to the interface circuit 17.

In response to the control signal (TC), the interface circuit 17 drives the indication control circuit 16 to indicate the present contents on the indicator 15. The present contents may be converted into a tone signal by the audio circuit 13 as desired and a tone is produced from the transmitter/receiver 11 or the loudspeaker 12.

The service engineer judges the quality of the equipment in accordance with an indication on the indicator or a tone generated, and operates the dial 14 to input another test instruction required for obtaining desired information on maintenance and diagnosis.

To be more specific, when it is intended to set a specified radio channel, for example, No. 123, keys of the dial 14 are sequentially operated as follows:

dial key 3—for setting the channel (instruction code)
dial key *—for terminating the inputting of the instruction code
dial keys 1, 2 and 3 in this order—for designating the channel number (additional data)
dial key #—for terminating the inputting of the additional data
dial key 4—for reading the status The processor (PRC) 28 reads the test instruction and the additional data to process the test instruction in accordance with a predetermined procedure and sends a control signal (RC) via the input/output port 21B to the radio transmitter/receiver unit 30 so that the unit 30 can be set to a state desired for setting the radio channel No. 123.

Then, the processor (PRC) 28 reads the statuses of the RAM 23 and the input/output port 21B and edits the present data in accordance with a predetermined procedure to indicate the same on the indicator 15 as in the precedence.

The indication contains, for example, a radio channel number (for example, "123") and a predetermined number of digits indicative of various types of status information which follow the radio channel number.

Figure 5:
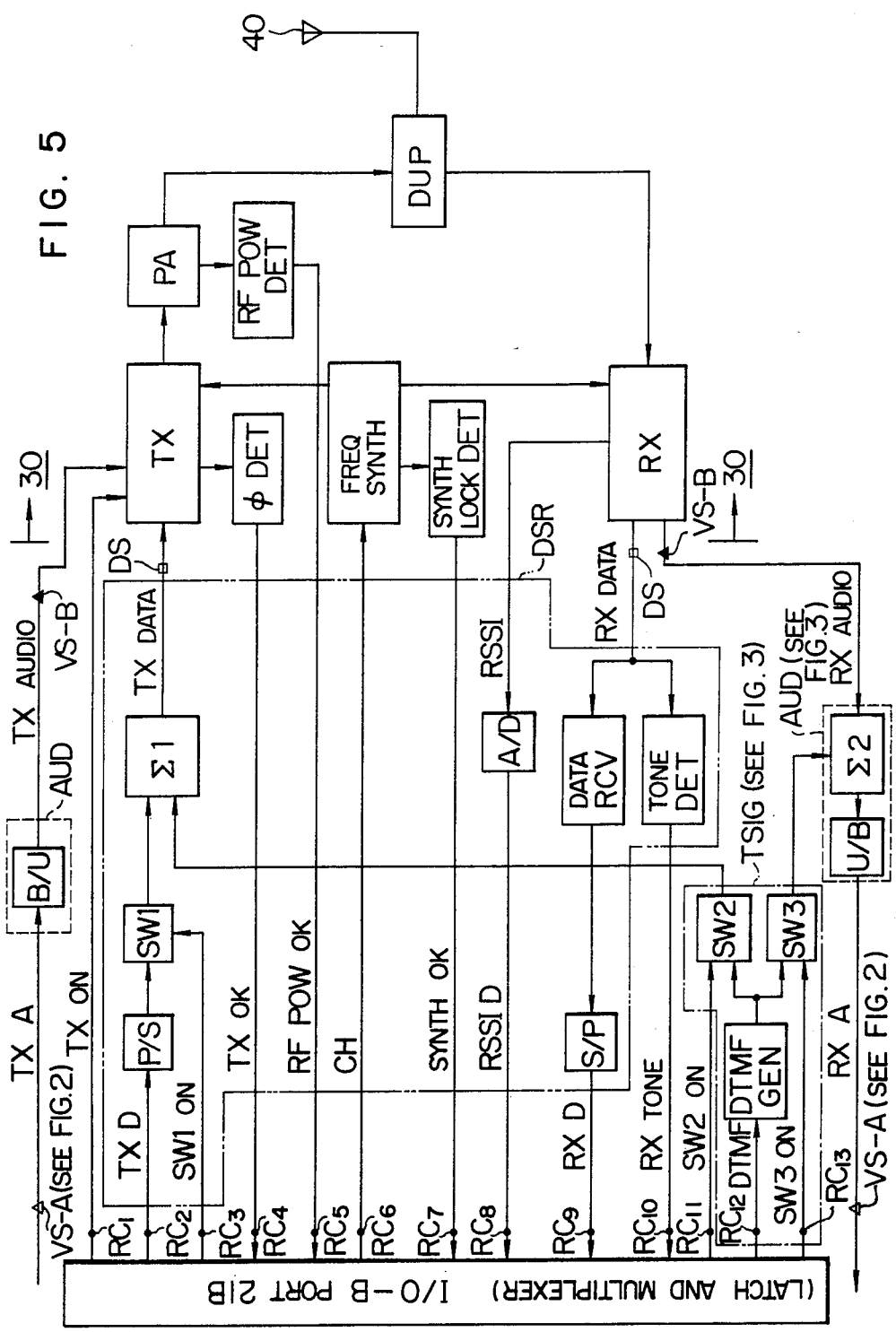
FIG. 5 is a block diagram showing details of part of the control unit shown in FIG. 3.

FIG. 5 shows a righthand half of FIG. 3. Each test instruction will be described in greater detail by referring to FIG. 5.

When the dial keys 1 and * are operated, the processor (PRC) 28 sends a dual tone multi-frequency signal (DTMF) to a dual tone multi-frequency generator (DTMF GEN) via the input/output port 21B so as to produce a predetermined tone signal and at the same time, it closes switch circuits (SW2) and (SW3) via the input/output port 21B. Under this condition, the predetermined tone is sent to a transmitter (TX) via a sum circuit (Σ1) and a line (TX DATA) and on the other hand, is sent to a receiver (11) or a loudspeaker included in the telephone unit 10 via the switch circuit (SW3), a sum circuit (Σ2), an umbalance-balance converter (U/B), a line (RX AUDIO) and the audio circuit 13. As a result, the service engineer can hear a tone.

When the dial keys 2 and * are operated, the processor (PRC) 28 stops generating the tone signal and opens the switch circuits (SW2) and (SW3). As a result, the tone disappears. With the dial keys 3, *, 1, 2, 3 and # operated, the processor (PRC) 28 sends a channel signal (CH) via the input/output port 21B to a frequency synthesizer (FREQ SYNTH) which in turn is turned to a designated channel frequency that is channel No. 123 in this example.

When the dial keys 4 and * are operated, the processor (PRC) 28 reads the content of the designated channel number, i.e. the content designating FREQ SYNTH stored in one address of RAM 23 and at the same time, it reads signals representative of statuses via the input-/output port 21B. The status signal includes a signal (TX OK) representative of normal state of the transmitter (TX) and produced from a phase detector of modulator ($\phi$DET), a signal (RF POW OK) representative of normal state of a power amplifier (PA) and produced from a radio frequency power detector (RF POW DET), and a signal (SYNTH OK) representative of normal state of the frequency synthesizer (FREQ SYNTH) and produced from a frequency synthesizer lock detector (SYNTH LOCK DET). These status signals are edited into an indication format and indicated on the indicator 15. The phase detector of modulator ($\phi$DET), radio frequency power detector (PF POW DET) and frequency synthesizer lock detector (SYNTH LOCK DET) are included in the radio transmitter/receiver unit 30. The service engineer can check the quality of the equipment by observing indications.

When the dial keys 5 and * are operated, a signal (RSSI) for received signal strength indication produced from the receiver (RX) is subjected to A/D conversion at an A/D converter to produce a digital signal (RSSID), thereby indicating received signal strength. This indication shows a connection failure of the antenna, a failure of the receiver or the car being outside a service area (outside an electromagnetic wave reaching distance).

With the dial keys 6 and * operated, a signal sent from a base station (not shown) is reproduced at a data receiving circuit (DATA RCV) and stored in the RAM 23 so as to be indicated subsequently. By analyzing the contents, the quality of the equipment can be judged. With the dial keys 7, *, address operated in that order and then # operated, the memories are accessed by an address in the form of, for example, octal configuration to indicate addressed contents of the memories or contents read by the input/output ports 21A and 21B.

Thus, by providing the detector for information required for maintenance, commands generated by the dial keys and processing programs corresponding to the commands, the system of the present invention can have extended self-maintenance and diagnosis capability. It is of significance to consider what is detected to bring about effective results, how much the detector costs and how much the scale of hardware can be extended. Putting costs of developing the test programs aside, costs can be cut down for large capacity of the memories since capacity of programmable ROMs can be doubled year by year. Accordingly, by providing effective detectors, costs of system maintenance inclusive of maintenance and services can be reduced in accordance with the present invention.

The detector shown in FIG. 5 is for illustration only and the present invention is in no way limited thereto. Many modifications may be conceived depending on the manner of checking power supply voltage, size of the system and degree of costs. Also illustrated in FIG. 5 are a balance-unbalance converter (B/U), a parallel-serial converter (P/S), a switch circuit (SW1), a serial-parallel converter (S/P), a tone detector (TONE DET), and an unbalance-balance converter (U/B). Associated with these components are signals (TX A) and (TX AUDIO) representative of transmitted audio signals, a signal (TX ON) for turning on the transmitter (TX), a signal (TXD) representative of transmitted data, signals (RXD) and (RX DATA) representative of received data, a signal (RX TONE) representative of received tone, and a signal (RXA) representative of received audio signal. The antenna unit 40 is connected to the transmitter/receiver unit 30 via a duplexer (DUP). The input/output port 21B is comprised of latch and multiplexer.

Thus, the unitary system of the present invention can perform maintenance and diagnosis from the standpoint of the overall function without resort to any maintenance instruments by making use of the functions inherent to the mobile telephone equipment.

Even in the event that the subscriber operates inadvertently the switch 29 for inputting the test data information or dials inadvertently the specified dial number for inputting the test data information, no serious problems occur since erroneous telephone communication connection can be prevented and recovery to original states can be ensured by turning on or off the power supply switch in an ordinary manner.

As has been described, the present invention ensures that the unitary system can perform maintenance and diagnosis without resort to any maintenance instruments, thereby attaining efficient and economic maintenance and diagnosis of the mobile telephone equipment.

I claim:

1. A system for maintenance and diagnosis which is adapted for mobile telephone equipment of the type having a telephone unit, a control unit operable on the basis of stored program control, a radio transmitter/receiver unit and an antenna unit, said system comprising:
   means for generating a specified dial number signal from a dial of the telephone unit;
   means included in said control unit for reading the specified dial number signal and selecting a desired program previously stored in said control unit to perform diagnosis of said mobile telephone equipment; and
   means for indicating a result of the diagnosis on an indicator.

2. A system for maintenance and diagnosis of mobile telephone equipment according to claim 1 wherein said control unit comprises an input/output port for connection of the telephone unit and the radio transmission/reception unit, said input/output port having an input port connected with switch means for inputting test mode information and an output port connected with a data sending/reception circuit, a tone signal sending/reception circuit and an audio circuit.

3. A system for maintenance and diagnosis which is adapted for mobile telephone equipment having a telephone unit with an indicator for indication of at least dial numbers in addition to ordinary functions of a telephone set, a radio transmission/reception unit and an antenna unit for transmission and reception of control signals, data signals and audio signals used for telephone communication, and a control unit for effecting controlling and processing required for the aforementioned units on the basis of stored program control, said system comprising:
   means for inputting to an input/output port of said control unit test mode information in the form of a logic signal supplied manually or a specified dial number signal supplied by dialing the telephone unit so as to switch the mobile telephone equipment to a test mode and thereafter for inputting a predetermined test instruction and a predetermined additional data to said input/output port by dialing said telephone unit;
   means included in said control unit for reading the input instruction and data and selecting a desired, predetermined program to execute the same; and
   means for indicating a result of the execution on an indicator of said telephone unit.

* * * * *